United States Patent [19]

Howeth

[11] Patent Number: 4,756,727
[45] Date of Patent: Jul. 12, 1988

[54] HORIZONTALLY MOUNTED CYLINDRICAL SEGMENTED BORE PLEATED FILTER SYSTEM FOR ROTARY BROOM SWEEPERS

[76] Inventor: D. Franklin Howeth, 233 Chuck Wagon Trail, Fort Worth, Tex. 76108

[21] Appl. No.: 757,009

[22] Filed: Jul. 19, 1985

[51] Int. Cl.⁴ .............................................. B01D 46/04
[52] U.S. Cl. ......................................... 55/302; 55/378; 55/497; 55/508; 55/510
[58] Field of Search ................. 55/287, 356, 302, 304, 55/487, 492, 497, 498, 502, 508, 424–426, 510, 511, 493, 378; 15/349, 352; 210/411, 232, 493.1, 493.2, 493, 378

[56] References Cited

U.S. PATENT DOCUMENTS

| | | | |
|---|---|---|---|
| 2,475,808 | 7/1949 | Storm | 55/498 X |
| 3,206,178 | 9/1965 | Lamb | 210/497.01 X |
| 3,317,043 | 5/1967 | Vanderpoel | 210/232 X |
| 3,493,113 | 2/1970 | Rosaen | 210/333.1 X |
| 4,063,913 | 12/1977 | Kippel et al. | 55/498 X |
| 4,259,095 | 3/1981 | Johnson | 55/302 |
| 4,278,454 | 7/1981 | Nemesi | 55/302 |
| 4,289,510 | 9/1981 | Herndon | 55/510 X |
| 4,328,014 | 5/1982 | Burgoon et al. | 55/502 X |
| 4,482,365 | 11/1984 | Roach | 55/303 X |
| 4,514,875 | 5/1985 | Comer | 55/302 X |
| 4,537,681 | 8/1985 | Argiropoulos et al. | 55/499 X |
| 4,565,631 | 1/1986 | Bitzer et al. | 210/331.1 |

FOREIGN PATENT DOCUMENTS 0575641 2/1946 United Kingdom ................ 55/493

Primary Examiner—Charles Hart
Attorney, Agent, or Firm—Hubbard, Thurman, Turner & Tucker

[57] ABSTRACT

Disclosed is an air filtration system having a horizontally mounted cylindrical filter element. The sytem includes a clean air plenum having a substantially vertical wall with an inlet opening formed therein. A draw bar is supported at the center of the plenum inlet and extends horizontally away from the plenum. A partition member is mounted on the draw bar and includes a plurality of elongated radially extending partition panels. A cylindrical filter element is supported on the partition panels with the partition panels dividing the bore of the filter into a plurality of segments. An end plate is connected to the draw bar to engage the filter element. A reverse air discharge system is disposed in the plenum for discharging jets of pressure air to back-flush the filter segments. An elongated diverter element extends substantially parallel and in close proximity to the upper surface of the filter element.

15 Claims, 2 Drawing Sheets

HORIZONTALLY MOUNTED CYLINDRICAL SEGMENTED BORE PLEATED FILTER SYSTEM FOR ROTARY BROOM SWEEPERS

BACKGROUND OF THE INVENTION

A. Field of the Invention

The present invention relates generally to air filtration systems, and more particularly to a filtration system for use in a rotary broom sweeper having a horizontally mounted cylindrical segmented bore filter that may be inserted through the side of the hopper of the rotary broom sweeper.

B. Description of the Prior Art

In the art of power sweepers and similar types of equipment, various attempts have been made to develop air filters for removing the dust entrained in the sweeper vacuum air flow. Conventional power sweepers are typically provided with a hopper, which may include a vacuum or suction air flow system including a filter which is periodically cleaned by vibrating the filter element or by removing and replacing the filter element. There are several disadvantages associated with the prior art type power sweeper filters and an important aspect of the filter system requires that the filter be very compact, be capable of sustaining high loadings of particulate material entrained in the sweeper suction air stream and be capable of automatic or selective cleaning operations without removing the filter from the hopper.

In U.S. patent application Ser. No. 680,942, filed Dec. 12, 1984, there is disclosed a sophisticated self-cleaning filter system for use in sweepers adapted for severe environments. The system of Application Ser. No. 680,942 includes a single segmented bore oval filter. Among other desirable features, that system provides ideal vertical positioning of filter media pleating to enhance reverse flushing of the dust cake and provides adequate media surface in a single filter that is easily accessed for replacement.

The oval filter, however, is rather uncommon in pleated media filters. The most common filter form in industry is of a cylindrical open bore with one end of the bore closed by an endcap and having a mounting drawbolt hole located on the center axis of the cylinder for the purpose of mounting the filter within the cabinetry. A cylindrical filter having filter media area equal to an oval filter and mounted in its normal vertical position relative to pleat lay would have excessive length relative to hopper depth. In other words, due to geometric constraints on the construction of the hopper, a vertically mounted pleated media filter with its associated self-cleaning apparatus would require a housing too tall to fit practically within the hopper of a rotary broom sweeper.

Attempts to provide horizontally oriented pleated porous media filters have proven generally unsatisfactory in that such filters are difficult to clean by reverse flushing alone. The dust cake material flushed from the top side of a horizontally oriented filter tends to fall back onto the filter. The solution to the problem has been to rotate the filter element periodically. However, the preventative maintenance requirement of rotating the filter adds substantially to the operating cost and complexity of filtration systems.

Accordingly, it is an object of the present invention to provide a filter system that overcomes the shortcomings of the prior art. More particularly, it is an object of the present invention to provide a selfcleaning filtration system for a mobile rotary broom sweeper utilizing a single cylindrical segmented bore filter mounted in a horizontal position.

It is a further object of the present invention to provide a self-cleaning filtration system for a mobile rotary broom sweeper which includes a single horizontally mounted filter element within the debris hopper that is removable and insertable through a side wall of the hopper and which includes bore partition panels that not only divide the bore into segments but also guide and support the filter during installation.

It is yet a further object of the present invention to provide a horizontally mounted cylindrical pleated filter with an upper arc particle diverter by which the upper arc segment may be better cleaned in order to forego the conventional process of rotating the filter element as required for most horizontally mounted filters.

SUMMARY OF THE INVENTION

Briefly stated, the foregoing and other objects are accomplished by the filtration system of the present invention. In its broadest aspect, the filtration system of the present invention includes a clean air plenum that includes a vertical wall having an inlet opening therein to receive filtered air. A cylindrical pleated porous media filter is supported in a horizontal manner to extend away from the clean air plenum around the inlet. A reverse jet air discharge apparatus is disposed in the plenum adjacent the plenum inlet for discharging jets of pressure air to backflush and dislodge material from the outer surface of the filter element. A diverter structure is positioned closely adjacent to the upper side of the filter element. The diverter structure extends substantially parallel to the filter element and deflects or diverts laterally material dislodged from the outer surface of the filter element by the backflush system.

The filtration system of the present invention preferably includes a partitioning element for dividing the interior of the filter element into a plurality of segments. The partitioning element includes a plurality of elongated partition panels that extend radially from a central hub. One of the partition panels is vertically upstanding to underlie the diverter structure. Material flushed from the filter segment on one side of the vertically upstanding partition panel is diverted by the diverter structure so as not to be redeposited on the filter element.

The filter element is preferably mounted on a draw bar that is supported at the center of the plenum inlet. The draw bar runs through the core of the partitioning structure. An end plate is secured to the end of the draw bar and engages the outer end of the filter element.

The present invention provides a single cylindrical filter of adequate filter media area and with segmented bore partitions for the purpose of reverse flushing which may be conveniently mounted horizontally in a mobile rotary broom sweeper hopper. The filter element may be conveniently inserted and withdrawn over the partition structures and draw bar through a side entry port in the hopper of the mobile rotary broom sweeper. The partition structures are preferably symmetrically arranged about the draw bar so as to provide an ideal guide system for loading the filter element into its mounting position and centralizing the filter element while in use.

In another aspect of the invention, the reverse cleaning process for horizontally mounted cylindrical pleated porous media filters is greatly improved by the provision of means for diverting or deflecting material dislodged from the filter during flushing into a horizontal trajectory so that the material clears the outside bounds of the filter element. By placing the diverter structure parallel to and directly over the center axis and in close proximity to the upper surface of the filter element, particles of the collected dust cake that are flushed from the upper arc segment of the filter will strike the diverter and will thus be diverted into a desirable horizontal trajectory.

The combination of the diverter and the vertically upstanding partition panel is particularly advantageous in that material flushed from one side of the partition panel is not redeposited on the other side of the partition panel. Even without partition panels, the diverter allows the cylindrical pleated porous media filter to be effectively cleaned in a horizontal position without periodic rotation of the filter element.

DESCRIPTION OF THE PREFERRED EMBODIMENT

Figure 1:
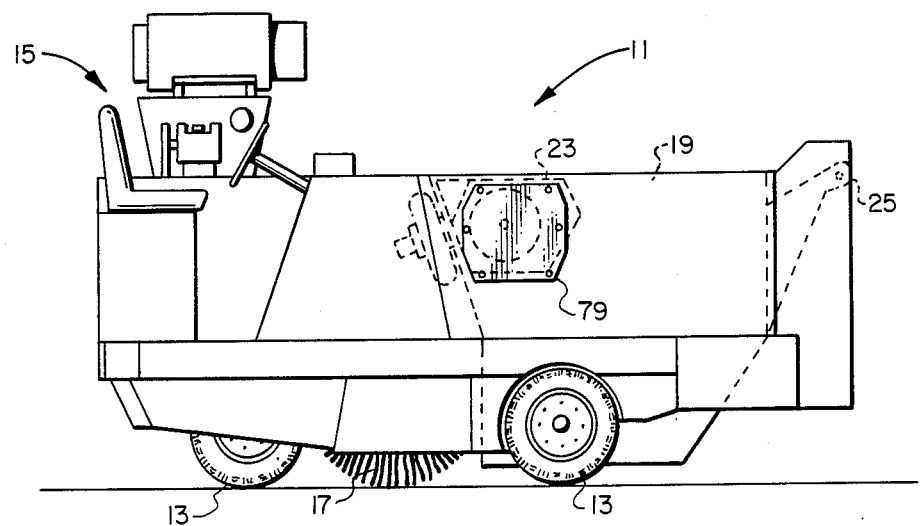
FIG. 1 is a side elevation view of a mobile rotary broom sweeper incorporating the filtration system of the present invention.

Referring now to the drawings, and first to FIG. 1, a mobile rotary broom sweeper is designated generally by the numeral 11. Sweeper 11 is self-propelled by means of wheels 13. Sweeper 11 is controlled by an operator who sits at a control station designated generally by the number 15.

Sweeper 11 includes a horizontally mounted cylindrical rotary broom 17 that is driven to rotate in a direction opposite to the direction of travel of sweeper 11. The rotation of broom 17 causes dust and debris to be dislodged from the surface upon which sweeper 11 is driven and swept into a dust and debris collection hopper 19. Hopper 19 is a generally box-like container having opposed side walls 21 (best shown in FIG. 3) and a top wall 23. Hopper 19 is pivotally mounted to sweeper 11 by means of support brackets 25 (one of which is shown) for movement between a working position, as shown in FIG. 1, and an elevated dumping position (not shown). A discharge door 27 is provided in top wall 23 of hopper 19 to open when hopper 19 is in the discharge position to discharge dust and debris collected within hopper 19.

Figure 2:
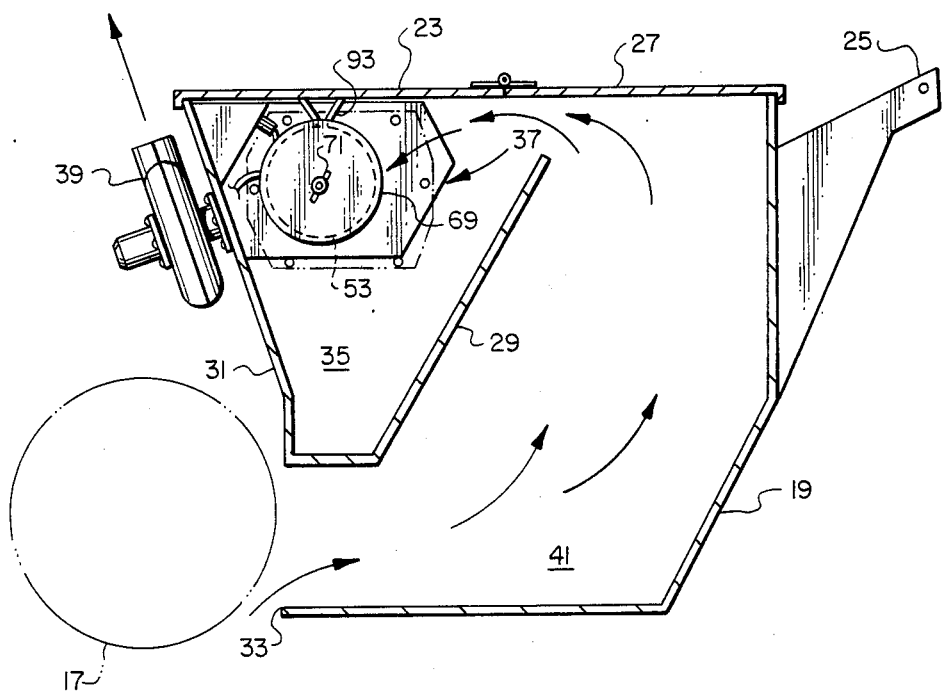
FIG. 2 is a sectional view showing details of the hopper of the mobile rotary broom sweeper of FIG. 1.

Referring particularly to FIG. 2, hopper 19 typically includes an interior partition 29 extending from the rear wall 31 of hopper 19 above a dust and debris inlet 33. Interior partition 29 forms an interior dust chamber 35 within which is disposed an air filtration system designated generally by the numeral 27. A suction air pump or fan 39 is provided for inducing air flow through the interior of hopper 19 from inlet 33 through filtration system 37 in the manner shown by arrows in FIG. 2. Relatively heavy particles of debris and dirt settle at the bottom of the main chamber 41 of hopper 19 while the lighter dust-like particles flow around interior partition 29 and onto the surface of a filter element 53 of air filtration system 37. The dust cake collected on filter element 53 is periodically dislodged and is collected at the bottom of dust chamber 35.

Figure 3:
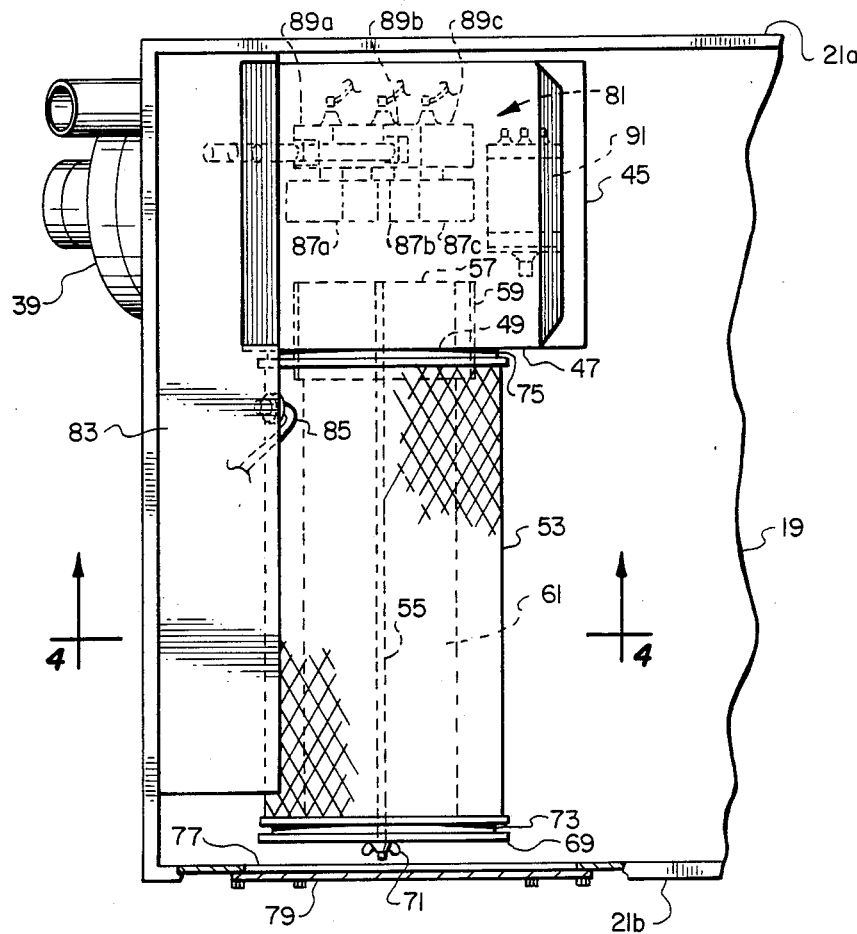
FIG. 3 is a top plan view showing details of the filtration system of the present invention.
Figure 4:
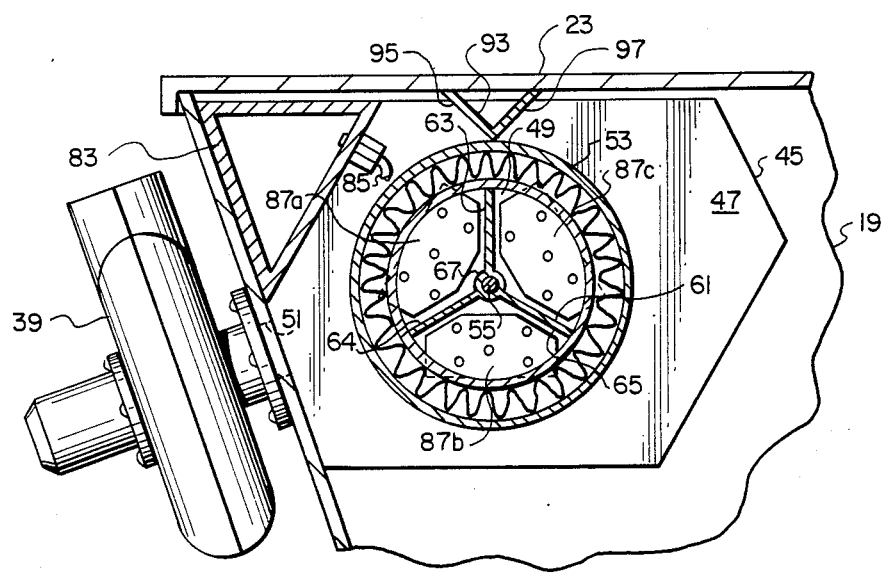
FIG. 4 is a sectional view along line 4—4 of FIG. 3.

Referring now to FIGS. 3 and 4, air filtration system 37 includes a clean air plenum 45 disposed in hopper 19 adjacent one side wall 21a. Hopper 19 is a generally box-like structure having an end wall 47 having an inlet port 49 therein. Clean air plenum includes an outlet port 51 connected to suction air pump 39. Operation of suction pump 39 thus causes air to flow into clean air plenum 45 through inlet port 49. Air filtration system 37 also includes a horizontally mounted cylindrical pleated porous media filter element 53.

Filter element 53 is mounted within hopper 19 by means of a mounting system which includes a draw bar 55. Draw bar 55 is supported at the center of inlet 49 of plenum 45 on a web 57. Web 57 includes a tubular portion 59 connected to plenum 45 and a plurality of radially inwardly extending support structures which are connected to and support draw bar 55.

An elongated partition member 61 is supported on draw bar 55 within filter element 53. Partition member 61 includes three partition panels 63, 64, and 65 which extend radially outwardly from a central tubular core 67 disposed on draw bar 55. Tubular core 67 may be either fixed on or removable from draw bar 55. However, in the preferred embodiment, tubular core 67 is fixed such that partition panel 63 is vertically upright, as shown in FIG. 4.

Partition member 61 serves to provide vertical support to filter element 53 both during insertion and during use. Partition member 61 also serves to divide the central bore of filter element 53 into a plurality of segments.

An end plate 69 is positioned on the end of draw bar 51 to engage and hold in place filter element 53. A wing nut or the like 71 is threadedly engaged with the end of draw bar 55 to hold end plate 69 in engagement with filter element 53. An end seal 73 is preferably provided between end plate 69 and one end of filter element 53. An end seal 75 is also preferably provided between the other end of filter element 53 and wall 47 of plenum 45.

Filter element 53 is insertable over and removable from draw bar 55 and partition member 61 through an entry port 77 formed in side wall 21b of hopper 19. A coverplate or door 79 is removably connected to side wall 21b by screws or the like and is removable to permit access to filter element 53.

Air filtration system 37 includes a reverse flushing system shown in phantom in FIG. 3 and designated generally by the numeral 81. Flushing sytem 81 is supplied with compressed air from a compressor (not shown) and is adapted to send periodic blasts of air into the bore of filter element 53 in a direction opposite the normal flow of air, thereby to dislodge dust cake from the surface of filter element 53.

Reverse flushing system 81 includes a flushing air reservoir 83 which receives compressed air through a hose 85. Flushing air reservoir 83 supplied compressed air to a set of flushing heads 87a, b, and c, (best shown in FIG. 4, through flushing valves 89a, b, and c, respectively.) Flushing valves 89a, b, and c, are adapted to open sequentially, as by means of a sequencer 91 thereby to flush filter element 53. The details of the operation of reverse flushing system 81 do not form part of the present invention and have been omitted for clarity.

Because of the horizontal disposition and pleated nature of filter element 53, it has been found that dust cake flushed from the topmost portions of filter element 53 may have a tendency to become redeposited on filter element 53 rather than being blown clear. For example, when flushing head 87a flushes its associated segment, air is still flowing in the normal direction through the segments of filter element 53 associated with flushing heads 87b and 87c. Thus, dust cake dislodged from the segment associated with flushing head 87a may tend to travel across the top of filter element 53 and become deposited on the segment associated with flushing head 87c. Accordingly, the present invention includes a diverter or deflector element 93. Diverter element 93 is an elongated downwardly pointing V-shaped structure having diverter veins 95 and 97. Partition member 61 is preferably arranged within filter element 53 such that partition panel 63 is vertically upstanding to underlie diverter element 93. Accordingly, dust cake dislodged from the surface of filter element on one side of panel 63 is deflected laterally so as not to be redeposited on the other side of panel 63.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. An air filtration system for removing dust and particulate material from an air stream, which comprises:
    a clean air plenum including a substantially vertical wall having an inlet opening therein for receiving clean air;
    a horizontally extending draw bar supported at the center of said plenum inlet;
    a vertically oriented horizontally extending first partition panel connected to said draw bar;
    a fully cylindrical filter element positioned about said draw bar and horizontally supported by said first partition panel, an upper, radially inner surface portion of said filter element bearing upon and circumferentially extending completely across a radially outer side surface portion of said partition panel;
    an end plate connected to said draw bar; and
    means for selectively and adjustably moving said end plate along said draw bar toward engagement with an end of said fully cylindrical filter element,
    said clean air plenum, filter element and end plate forming a clean air chamber with said dust and particulate material being deposited on the exterior surface of said filter element.

2. The air filtration system as claimed in claim 1, including a second partition panel connected to said draw bar and extending radially into contact with said filter element.

3. The air filtration system as claimed in claim 1, including means for sealing between said filter element and said clean air plenum wall.

4. The air filtration system as claimed in claim 2, including means for sealing between said filter element and said end plate.

5. The air filtration system as claimed in claim 1, including reverse jet air discharge means disposed adjacent to said plenum inlet for discharging jets of pressure air to backflush said filter element.

6. The air filtration system as claimed in claim 5, including diverter means extending substantially parallel to the outside surface of said filter element and vertically overlying said first partition panel for diverting laterally material flushed from said filter element, thereby to prevent material flushed from the filter element on one side of said first partition panel from being redeposited on the other side of said first partition panel.

7. A filtration system, which comprises:
    a clean air plenum including a substantially vertical end wall having an inlet therein;
    a substantially horizontally extending cylindrical filter element mounted to said end wall about said inlet;
    reverse jet air discharge means disposed adjacent to said plenum inlet for discharging jets of pressure air into the interior of said filter element to backflush and dislodge material from the outer surface of said filter element;
    and diverter means extending substantially parallel to said outer surface of said filter element vertically above said filter element for diverting laterally material dislodged from said outer surface of said filter element, thereby to prevent material dislodged form said outer surface from being redeposited thereon,
    said diverter means including a diverter member having a lower edge portion closely adjacent said outer surface and extending longitudinally between adjacent upper circumferential portions thereof, and a duality of wall portions which extend upwardly and laterally outwardly in opposite directions from said lower edge portion and are spaced upwardly from said adjacent upper circumferential portions, whereby material dislodged generally upwardly from either of said upper circumferential portions impinges upon an associated one of said wall portions and is laterally outwardly diverted thereby to prevent the dislodged material from being redeposited upon said outer surface.

8. The filtration system as claimed in claim 7, including means for partitioning the interior of said filter element into a plurality of axial segments.

9. The filtration system as claimed in claim 8, wherein said partitioning means includes a vertically upstanding elongated partition panel positioned ins aid filter element underlying said diverter means.

10. The filtration system as claimed in claim 7, including:
    a draw bar supported at the center of said plenum inlet port and extending substantially horizontally through said filter element;
    and an end plate connected to said draw bar in engagement with said filter element.

11. The filtration system as claimed in claim 10, including a plurality of elongated partition panels extending radially from said draw bar to divide the interior of said filter element into a plurality of segments.

12. The filtration system as claimed in claim 11, wherein one of said partition panels is vertically upstanding and undelies said diverter means.

13. A dust and debris collection system for use in a mobile rotary broom sweeper, said system comprising:
 a hopper positioned in said sweeper, said hopper including a dust and debris inlet and a pair of spaced apart side walls;
 a clean air plenum positioned in said hopper, said clean air plenum including a vertical wall having an inlet therein;
 a draw bar supported at the center of said plenum inlet and extending horizontally away from said plenum and into said hopper;
 a plurality of elongated partition panels extending radially from said draw bar, one of said partition panels being vertically upstanding;
 a cylindrical filter element supported on said partition panels with said partition panels dividing the bore of said filter element into a plurality of segments;
 an end plate connected to said draw bar in engagement with said filter element;
 reverse air discharge means disposed adjacent to said plenum inlet for discharging jets of pressure air to backflush said filter segments;
 and diverter means extending substantially parallel to the exterior surface and overlying said vertically upstanding partition panel for diverting laterally material flushed from said filter element.

14. The dust and debris collection system as claimed in claim 13, including door means in one of said side walls for permitting insertion and removal of said filter element into and from said hopper.

15. The filtration system of claim 7 wherein:
 said end wall has a single inlet therein, and
 said filter element has an open end and is mounted to said end wall in a manner such that said open end circumscribes said single inlet to permit fluid laterally entering the interior of said filter element from any circumferential portion of the filter element to be flowed into said clean air plenum through said single inlet, and additionally permit said reverse jet air discharge means to simultaneously discharge a jet of pressure air inwardly through said single inlet into the interior of said filter element.

* * * * *